US008880433B2

(12) United States Patent
Starr et al.

(10) Patent No.: US 8,880,433 B2
(45) Date of Patent: Nov. 4, 2014

(54) DYNAMIC AUTHENTICATION OF MARK USE

(75) Inventors: Robert J. Starr, Decatur, GA (US); Samuel N. Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1587 days.

(21) Appl. No.: 11/106,157

(22) Filed: Apr. 14, 2005

(65) Prior Publication Data

US 2006/0236103 A1  Oct. 19, 2006

(51) Int. Cl.
*G06Q 20/00* (2012.01)
*H04L 9/32* (2006.01)
*H04L 29/06* (2006.01)
*H04L 9/08* (2006.01)
*G07F 17/16* (2006.01)

(52) U.S. Cl.
CPC .............. *H04L 9/32* (2013.01); *H04L 63/0428* (2013.01); *H04L 63/10* (2013.01); *H04L 9/0802* (2013.01); *H04L 2463/102* (2013.01); *G07F 17/16* (2013.01)
USPC .......................................................... 705/67

(58) Field of Classification Search
USPC .............. 705/67, 16, 21, 59, 71; 380/44, 262, 380/278, 279
See application file for complete search history.

(56) References Cited

U.S. PATENT DOCUMENTS

| 5,208,765 | A | 5/1993 | Turnbull |
| 5,423,531 | A | 6/1995 | Hoshizaki et al. |
| 5,509,070 | A | 4/1996 | Schull |
| 5,526,257 | A | 6/1996 | Lerner |
| 5,636,277 | A | 6/1997 | Nagahama |
| 5,892,900 | A | 4/1999 | Ginter et al. |
| 5,917,912 | A | 6/1999 | Ginter et al. |
| 5,991,751 | A | 11/1999 | Rivette et al. |
| 5,995,625 | A | 11/1999 | Sudia et al. |
| 6,029,141 | A | 2/2000 | Bezos et al. |

(Continued)

FOREIGN PATENT DOCUMENTS

| WO | WO 01/08031 | 2/2001 |
| WO | WO 01/24035 | 4/2001 |
| WO | WO 02/084506 | 10/2002 |

OTHER PUBLICATIONS

U.S. Official Action dated Sep. 3, 2004 in U.S. Appl. No. 09/750,130.

(Continued)

*Primary Examiner* — Dante Ravetti

(74) *Attorney, Agent, or Firm* — Hartman & Citrin LLC

(57) ABSTRACT

Disclosed are systems and methods for authenticating use of a mark. In one embodiment, a system for facilitation, authentication, and authorization of the use of a mark comprises a mark owner server that receives registration information from a reseller server via a network that requests to use a mark. The mark owner server determines whether the reseller server is authenticated to use the mark. If the reseller server is authenticated to use the mark, the mark owner server sends a key to the reseller server. The mark owner server receives the key from the reseller server to access the mark via the network and determines whether the reseller server is authorized to use the mark based on the key. If the reseller server is authorized to use the mark, the mark owner server sends a first mark via the network to be displayed.

6 Claims, 5 Drawing Sheets

(56) References Cited

U.S. PATENT DOCUMENTS

| | | | |
|---|---|---|---|
| 6,044,354 A | 3/2000 | Asplen, Jr. | |
| 6,049,811 A | 4/2000 | Petruzzi et al. | |
| 6,061,660 A | 5/2000 | Eggleston et al. | |
| 6,141,653 A | 10/2000 | Conklin et al. | |
| 6,236,977 B1 | 5/2001 | Verba et al. | |
| 6,272,472 B1* | 8/2001 | Danneels et al. | 705/27.1 |
| 6,289,341 B1 | 9/2001 | Barney | |
| 6,298,327 B1 | 10/2001 | Hunter et al. | |
| 6,321,983 B1 | 11/2001 | Katayanagi et al. | |
| 6,332,135 B1 | 12/2001 | Conklin et al. | |
| 6,336,105 B1 | 1/2002 | Conklin et al. | |
| 6,338,050 B1 | 1/2002 | Conklin et al. | |
| 6,345,239 B1 | 2/2002 | Bowman-Amuah | |
| 6,389,538 B1 | 5/2002 | Gruse et al. | |
| 6,446,045 B1 | 9/2002 | Stone et al. | |
| 6,460,023 B1 | 10/2002 | Bean | |
| 6,542,871 B1 | 4/2003 | Harshaw | |
| 6,625,581 B1 | 9/2003 | Perkowski | |
| 6,778,684 B1 | 8/2004 | Bollman | |
| 6,920,567 B1 | 7/2005 | Doherty et al. | |
| 6,954,741 B1 | 10/2005 | Burchetta et al. | |
| 6,999,936 B2 | 2/2006 | Sehr | |
| 7,000,242 B1 | 2/2006 | Haber | |
| 7,043,454 B2 | 5/2006 | Powell | |
| 7,099,849 B1 | 8/2006 | Reeder et al. | |
| 7,127,405 B1 | 10/2006 | Frank et al. | |
| 7,162,035 B1 | 1/2007 | Durst et al. | |
| 7,162,429 B1 | 1/2007 | Delgado et al. | |
| 7,272,572 B1 | 9/2007 | Plenkos | |
| 7,346,545 B2 | 3/2008 | Jones | |
| 7,475,246 B1 | 1/2009 | Moskowitz et al. | |
| 2001/0010041 A1 | 7/2001 | Harshaw | |
| 2001/0012389 A1 | 8/2001 | Welchman et al. | |
| 2001/0013004 A1 | 8/2001 | Haris et al. | |
| 2001/0018178 A1 | 8/2001 | Siefert | |
| 2001/0021978 A1* | 9/2001 | Okayasu et al. | 713/176 |
| 2001/0032189 A1 | 10/2001 | Powell | |
| 2001/0049661 A1 | 12/2001 | Power et al. | |
| 2002/0026478 A1* | 2/2002 | Rodgers et al. | 709/205 |
| 2002/0029156 A1 | 3/2002 | O'Dowd | |
| 2002/0032588 A1 | 3/2002 | Glazer et al. | |
| 2002/0048369 A1 | 4/2002 | Ginter et al. | |
| 2002/0077835 A1 | 6/2002 | Hagelin | |
| 2002/0091767 A1 | 7/2002 | Munson | |
| 2002/0095579 A1* | 7/2002 | Yoshiura et al. | 713/176 |
| 2002/0128903 A1* | 9/2002 | Kernahan | 705/14 |
| 2002/0129255 A1* | 9/2002 | Tsuchiyama et al. | 713/176 |
| 2002/0138300 A1 | 9/2002 | Hart et al. | |
| 2002/0191767 A1 | 12/2002 | Marchand et al. | |
| 2003/0033192 A1 | 2/2003 | Zyman et al. | |
| 2003/0063914 A1 | 4/2003 | Masuda et al. | |
| 2003/0097296 A1 | 5/2003 | Putt | |
| 2003/0161475 A1* | 8/2003 | Crumly et al. | 380/280 |
| 2003/0163431 A1* | 8/2003 | Ginter et al. | 705/64 |
| 2003/0165253 A1* | 9/2003 | Simpson et al. | 382/100 |
| 2003/0191672 A1 | 10/2003 | Kendall et al. | |
| 2004/0128224 A1* | 7/2004 | Dabney et al. | 705/37 |
| 2004/0199422 A1* | 10/2004 | Napier et al. | 705/14 |
| 2004/0220881 A1 | 11/2004 | Powell | |
| 2004/0243464 A1 | 12/2004 | Beck | |
| 2004/0255119 A1* | 12/2004 | Ukeda et al. | 713/169 |
| 2004/0257610 A1* | 12/2004 | Itoh et al. | 358/1.15 |
| 2005/0039111 A1 | 2/2005 | Abe et al. | |
| 2005/0149386 A1* | 7/2005 | Agura et al. | 705/14 |
| 2005/0149759 A1* | 7/2005 | Vishwanath et al. | 713/201 |
| 2005/0182939 A1* | 8/2005 | Yoshiura et al. | 713/176 |
| 2005/0203834 A1* | 9/2005 | Prieston | 705/38 |
| 2006/0129803 A1* | 6/2006 | Gentry et al. | 713/156 |
| 2006/0155613 A1* | 7/2006 | Foran et al. | 705/27 |
| 2006/0212364 A1* | 9/2006 | Lawe | 705/26 |
| 2007/0154111 A1* | 7/2007 | Ikegami | 382/282 |
| 2008/0021778 A1* | 1/2008 | Perkowski et al. | 705/14 |
| 2008/0195401 A1 | 8/2008 | Delgado et al. | |
| 2008/0228733 A1 | 9/2008 | David et al. | |
| 2008/0275822 A1 | 11/2008 | Delgado et al. | |

OTHER PUBLICATIONS

U.S. Official Action dated May 26, 2005 in U.S. Appl. No. 09/750,130.
U.S. Notice of Allowance / Allowability dated Feb. 7, 2006 in U.S. Appl. No. 09/750,130.
U.S. Notice of Allowance / Allowability dated Aug. 18, 2006 in U.S. Appl. No. 09/750,130.
U.S. Official Action dated Dec. 27, 2004 in U.S. Appl. No. 10/021,422.
U.S. Official Action dated Jun. 1, 2005 in U.S. Appl. No. 10/021,422.
U.S. Official Action dated Jan. 13, 2006 in U.S. Appl. No. 10/021,422.
U.S. Notice of Allowance / Allowability dated Sep. 5, 2006 in U.S. Appl. No. 10/021,422.
U.S. Notice of Allowance / Allowability dated Nov. 1, 2006 in U.S. Appl. No. 10/021,422.
U.S. Official Action dated Jul. 9, 2007 in U.S. Appl. No. 11/612,612.
U.S. Notice of Allowance / Allowability dated Dec. 6, 2007 in U.S. Appl. No. 11/612,612.
U.S. Appl. No. 11/612,612, entitled: "System and Method for Managing Sponsorships," filed Dec. 19, 2006, Inventors: Marcus Delgado et al.
U.S. Appl. No. 11/612,645, entitled: "System and Method for Managing Sponsorships," filed Dec. 19, 2006, Inventors: Marcus Delgado et al.
U.S. Appl. No. 09/750,000, entitled: "System and Method for Managing Intellectual Property," filed Dec. 29, 2000, Inventors: Frank et al., now abandoned.
U.S. Appl. No. 09/750,001, entitled: "System and Method for Marketing, Managing, and Maintaining Intellectual Property," filed Dec. 29, 2000, Inventors: Frank et al.
U.S. Appl. No. 09/750,012, entitled: "System and Method for Developing and Implementing Intellectual Property," filed Dec. 29, 2000, Inventors: Frank et al.
U.S. Appl. No. 09/750,136, entitled: "System and Method for Managing Intellectual Property Life Cycles," filed Dec. 29, 2000, Inventors: Frank et al.
U.S. Appl. No. 09/750,154, entitled: "System and Method for Determining the Marketability of Intellectual Property Assets," filed Dec. 29, 2000, Inventors: Frank et al.
U.S. Application No. 09/946,457, entitled: "System and Method for Managing Intellectual Property," filed Sep. 6, 2001, Inventors: Frank et al.
U.S. Appl. No. 09/946,593, entitled: "System and Method for Managing Intellectual Property Life Cycles," filed Sep. 6, 2001, Inventors: Frank et al.
U.S. Appl. No. 10/188,209, entitled: "System and Method for Developing and Implementing Intellectual Property," filed Jul. 3, 2002, Inventors: Frank et al.
"Seminar Looks at Corporate Sponsorship," Nov. 11, 1987, The Gazette, Montreal, p. C.4.
"Sponsor Direct," Web Site, Jun. 19, 2001, www.sponsordirect.com.
Berkowitz, Leonard, "Getting the Most from you Patents," Research-Technology Management, v. 32, n. 2, pp. 26-31, Mar./Apr. 1993.
Bjomer, Susan, N., "Patent and Trademark Databases: Intellectual Property for the Masses," Link-Up, v.9, n. 4, p. 14, Jul-Aug. 1992.
Burnett, et al. *RSA Security's Official Guide to Cryptography*. Chapters 5, 6 and 10, McGraw-Hill Osborne Media, pp. 137-170, 171-207, 293-308, Apr. 2001.
Cisco web site LOGO Program, http:/www.cisco.com/logo/, printed Oct. 22, 2001.
Dictionary.com, Intellectual Property definition, printed May 24, 2005.
Freedman, Harry, "The Art of Corporate Underwriting and Sponsorship," Sep. 1998, Fund Raining Management, v. 29, p. 23.
Hufker, et al. "Patents: A Managerial Perspective," Journal of Product & Brand Management, v. 3, n. 4, pp. 44-54, 1994.
Iandiario, Joseph S., "Patents and Copyrights: Protecting Intellectual Property," Microwave Journal, v.34, n.4, p. 30, Apr. 1991.
Kempner, Richard, et al., "Many a Slip," Managing Intellectual Property, v. 7, n.42, pp. 15-26, Sep. 1994.

(56) References Cited

OTHER PUBLICATIONS

Kimmerling, George, "A Licensing Primer for Trainers," Training & Development, v. 51, n. 6, pp. 98-109, Jun. 1994.

Munson, Michael, "Fund Raising Management," Gale Group Inc., v. 32, n.7, p. 40, Sep. 1, 2001.

Murray, Kathleen, "HR takes Steps to Protect Trade Secrets," Personal Journal, v. 73, n. 6, pp. 98-109, Jun. 1994.

Rossiter, John, "Advertising Communications & Promotion Management," 1997, Irwin/MaGraw-Hill, second edition, pp. 332-347.

Santesson, et al., "Internet X.509 Public Key Infrastructure: Logotypes in X.509 Certificates," Feb. 2004, Microsoft, Network Working Group Request for Comments: 3709-Category: Standards Track, pp. 1-21.

Sepia web site on SOTISE product, http:/www.sepia.com/eng/about.html, printed Nov. 19, 2001.

Smith, Richard, *Authentication: From Passwords to Public Keys*, Addison-Wesley Professional, pp. 369-429, Oct. 2001.

Smith, Richard, *Internet Cryptography*, Addison-Wesley Professional, pp. 278-320, Jul. 1997.

Sun Microsystems web site Logo Program, http:/www.sun.com/logos/dot-com/static.html, printed Oct. 22, 2001.

Thomcroft, Tony, "Corporate Friends Needed Sponsorhip," Dec. 4, 1998, Financial Times, p. 19.

Wineburg, et al., "Managing Intellectual Property: An International Capital Asset," Commercial Law Journal, v. 99, n. 3, pp. 366-383, Fall 1994.

Wayner, Peter, *Disappearing Cryptography*, Morgan Kaufmann, pp. 291-302, Apr. 2002.

U.S. Official Action dated Oct. 7, 2008 in U.S. Appl. No. 11/612,645.

U.S. Official Action dated Oct. 29, 2009 in U.S. Appl. No. 11/612,645.

U.S. Notice of Allowance / Allowability dated Mar. 19, 2008 in U.S. Appl. No. 11/612,612.

U.S. Official Action dated Apr. 28, 2010 in U.S. Appl. No. 11/612,645.

U.S. Official Action dated Oct. 18, 2011 in U.S. Appl. No. 11/612,645.

Logo Cops: The Law and Business of Collegiate Licensing, Lattinviile, Robert, 5 Kan. J.L. & Pub. Pol'y 81, sprin 1996. pp. 81-124.

How Networks Work, Bestseller Edition. Frank Derfler and Les Freed. Macmillan Computer Publishing USA, 1996.

Internet Archive Wayback Machine archive of "Information Above the Academic Permissions Service." Archived Jan. 10, 1998.

U.S. Official Action dated Mar. 29, 2011 in U.S. Appl. No. 12/140,455.

U.S. Official Action dated Mar. 31, 2011 in U.S. Appl. No. 11/612,645.

U.S. Official Action dated Oct. 14, 2010 in U.S. Appl. 11/612,645.

U.S. Official Action dated Nov. 4, 2010 in U.S. Appl. No. 12/140,455.

U.S. Notice of Allowance mailed Jul. 1, 2013, in U.S. Appl. No. 12/140,455.

U.S. Notice of Allowance mailed Jun. 6, 2013, in U.S. Appl. No. 13/569,263.

U.S. Appl. No. 12/140,455 Notice of Allowance mailed Oct. 18, 2013.

U.S. Notice of Allowance dated May 22, 2012 in U.S. Appl. No. 11/612,645.

* cited by examiner

DYNAMIC AUTHENTICATION OF MARK USE

TECHNICAL FIELD

The present disclosure relates to computers, and more particularly, the disclosure relates to systems and methods for authentication.

BACKGROUND OF THE DISCLOSURE

Trademarks and Servicemarks ("Marks") are used in economic source signaling, and owners of marks often use the marks to indicate licensed, certified, or qualified third-party resellers of the mark owners' goods and/or services. Professional organizations (e.g., doctors, attorneys, engineers, accountants, etc.), consumer bureaus (e.g., Underwriters Laboratories and Better Business Bureau), and standards organizations (ANSI, DOCSIS) also use marks to indicate that products and/or services of third parties meet various requirements. However, mark usage is difficult to control by the owner of the mark when the qualifications of the third-party change, from certified to uncertified, i.e., when the qualifications no longer meet the various requirements.

Typically, the owner of the mark manually tells a reseller to stop indicating support/sales of the marked goods/services when the reseller no longer meets the quality standards or no longer has access to sell the marked goods or services. In a fixed medium, such as but not limited to paper telephone advertising directory books, the reseller may not be able to change the advertising until the next printing of the advertising book. However, digital networked media such as the Internet offer dynamic and immediate mark updating capabilities. Even with the dynamic updating capabilities, current trademark and service mark logo use on web pages is controlled by the owner of the web page, which normally would be the reseller. Thus, there is typically no way for the owner of the mark to automatically take away access rights to display the mark on the digital media such as a web page. Consumers using telephone directory advertising books generally do not consider the staleness of the printing of the advertising book in evaluating marks because there is no simple way for the consumer to discern that a mark shown in the book is no longer valid. Similarly, the delayed and manual mark updating system, even for marks used in digital media, allows consumers to be misled by stale and counterfeit marks on the Internet.

Thus, a heretofore-unaddressed need exists in the industry to address the aforementioned deficiencies and inadequacies.

SUMMARY OF THE DISCLOSURE

Disclosed are systems and methods for authenticating use of a mark. In one embodiment, a method for facilitating the authentication and authorization of the use of a mark comprises receiving registration information from a reseller server via a network that requests to use a mark and determining whether the reseller server is authenticated to use the mark. The method further comprises sending a key to the reseller server if the reseller server is authenticated to use the mark and receiving the key from the reseller server to access the mark via the network. The method further comprises determining whether the reseller server is authorized to use the mark based on the key and sending a first mark via the network to be displayed if the reseller server is authorized to use the mark.

In one embodiment, a system for facilitating the authentication and authorization of the use of a mark comprises a mark owner server that receives registration information from a reseller server via a network that requests to use a mark. The mark owner server determines whether the reseller server is authenticated to use the mark. If the reseller server is authenticated to use the mark, the mark owner server sends a key to the reseller server. The mark owner server receives the key from the reseller server to access the mark via the network and determines whether the reseller server is authorized to use the mark based on the key. If the reseller server is authorized to use the mark, the mark owner server sends a first mark via the network to be displayed.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The disclosed systems and methods can be better understood with reference to the following drawings. The components in the drawings are not necessarily to scale.

DETAILED DESCRIPTION

Disclosed herein are systems and methods for authenticating use of a mark. In particular, a reseller that would like to use a mark can be authenticated via a network, and the mark that is used by a reseller can be controlled, tracked, and monitored via the network. Example systems are first discussed with reference to the figures. Although these systems are described in detail, they are provided for purposes of illustration only and various modifications are feasible. After the example systems have been described, examples of operation of the systems are provided to explain the manner in which the reimbursement processing can be achieved.

Figure 1:
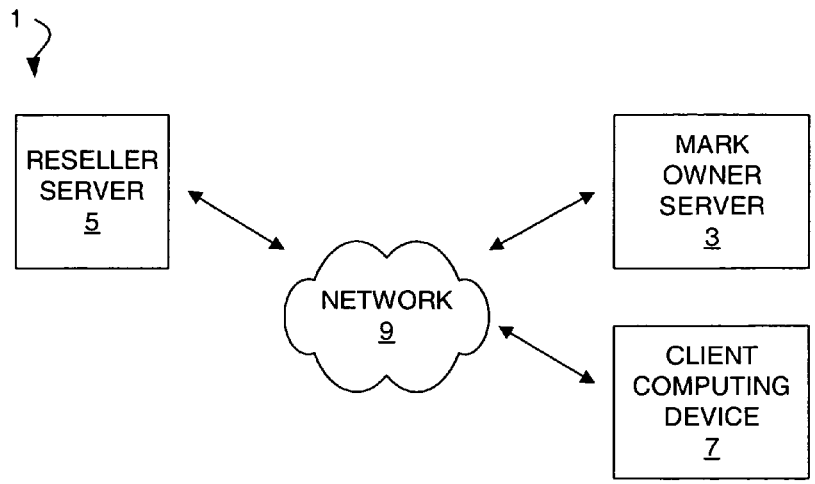
FIG. 1 is a schematic view of an embodiment of a system through which authenticating the use of a mark can be processed.

Referring now in more detail to the figures in which like reference numerals identify corresponding parts, FIG. 1 illustrates an example system 1 that authenticates the use of a mark. As indicated in this figure, the system 1 generally comprises a user mark owner server 3, a reseller server 5, and a client computing device 7. Although FIG. 1 shows one user mark owner server 3, one reseller server 5, and one client computing device 7, it should be appreciated that there may be multiple user mark owner servers 3, multiple reseller servers 5, and multiple client computing devices 7 (also referred to herein as "network clients"). The reseller server 5 requests the use of a mark from a mark owner server 3 via the network 9, which includes the Internet in one embodiment, as well as one or more other conventional local and wide area networks, among others. The mark owner server 3 determines whether to authenticate the reseller to use the mark of a mark owner.

If the reseller server 5 is authenticated, the mark owner server 3, in one embodiment, sends an encrypted mark (not shown) to the reseller server 5, which in turn makes that mark available for transmission through the network 9 for display on a client computing device 7. In some embodiments, the mark owner server 3, reseller server 5, and client computing devices 7 are considered part of the network 9, but are shown separate in FIG. 1 for purposes of illustration. Thus, when a client computing device 7 receives through the network 9 a mark for display, such as when a user interacts with a browser client (not shown) to invoke the display of a web page on the client computing device 7, for example, the mark is considered to have been in a sense displayed on the network, in one example among others.

The encrypted mark can, in one embodiment, include time expiring software that enables the encrypted mark to be displayed for a certain time period, e.g., one day, one week, one month, one quarter of a year, one half of a year, a year, etc. The time expiring software application can receive clock information from a network time server to prevent the reseller from tampering with the clock. A customer or end user can view the encrypted mark that is stored on the reseller server 5 via the client computing device 7, which can, for instance, comprise desktop personal computers (PCs) or other types of computers.

In an alternative embodiment, if the reseller server 5 is authenticated, the mark owner server 3 sends a key or password (not shown), etc., to the reseller server 5. The key or password enables the reseller to access a mark stored in the mark owner server 3 in which the mark can be made available for display through network 9 by client computing devices 7. For example, when an end user accesses a web page from a reseller server 5, the reseller server 5 sends a uniform resource locator (URL) to the mark owner server 3 that includes the key and the reseller's identification information. If the reseller is authorized to use a mark, the reseller server 5 pulls the mark from the mark owner server 3 and transmits the mark for display on a client computing device 7 for the end user to view. Thus, in one embodiment, the owner server 3 includes programming (logic) for, among other functions referenced herein, initially registering a reseller, as well as providing real-time authorization verification as end users attempt to view marks. In another example, the reseller server 5 can obtain an encrypted mark having time expiring software from the mark owner server 3 using the key. In yet other embodiments, reseller web pages accessible by end users include URLs that point directly to mark owner web servers and further include identification information corresponding to particular resellers so that the mark owner servers can control access to the marks through real-time authorization control or manipulation of stored marks, i.e., marks associated with certain resellers can be changed (or deleted) to reflect changes in reseller authorization.

In an alternative embodiment, the mark owner 3 can provide via the network 9 a list of certified resellers who are authenticated and authorized to display the mark. The end user can verify on the mark owner server 3 via the network 9 that a particular reseller is certified by the mark owner.

Figure 2:
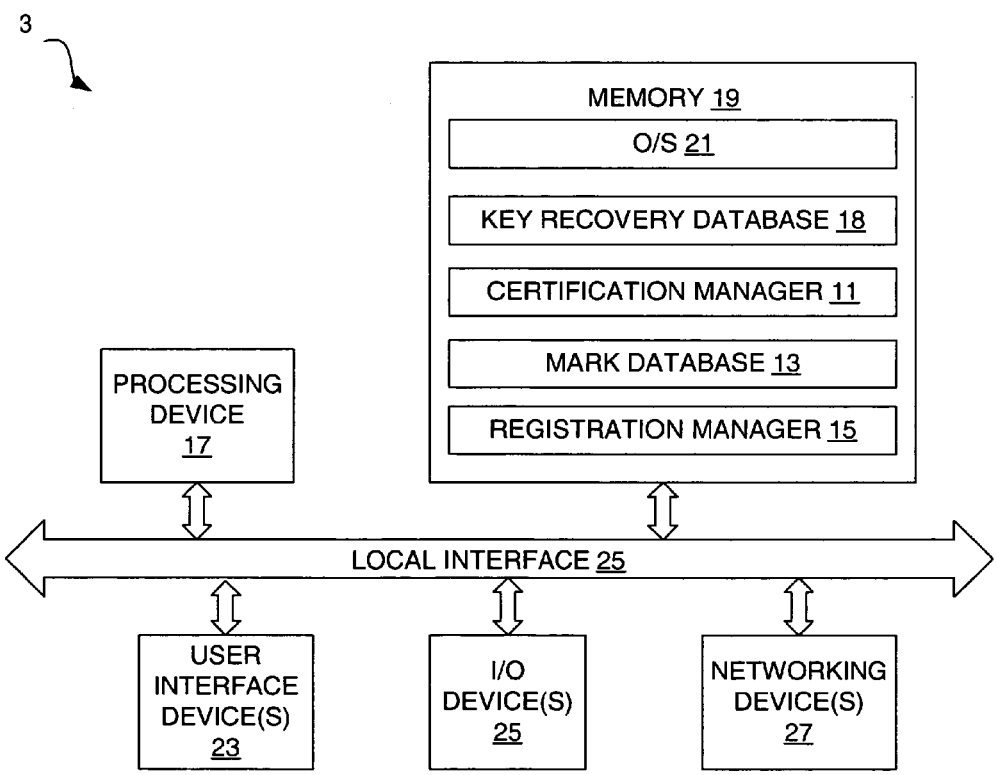
FIG. 2 is a block diagram of an embodiment of a mark owner server shown in FIG. 1.

FIG. 2 is a block diagram illustrating an exemplary architecture for the mark owner server 3 shown in FIG. 1. As indicated in FIG. 2, the mark owner server 3 comprises a processing device 17, memory 19, one or more user interface devices 23, one or more I/O devices 25, and one or more networking devices 27, each of which is connected to a local interface 25. The processing device 17 can include any custom made or commercially available processor, a central processing unit (CPU) or an auxiliary processor among several processors associated with the mark owner server 3, a semiconductor based microprocessor (in the form of a microchip), or a macroprocessor. The memory 19 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 23 comprise those components with which the user (e.g., administrator) can interact with the mark owner server 3. Where the mark owner server 3 comprises a server computer or similar device, these components can comprise those typically used in conjunction with a PC, such as a display device, keyboard and mouse.

The one or more I/O devices 25 comprise components used to facilitate connection of the mark owner server 3 to other devices and therefore, for instance, comprise one or more serial, parallel, small system interface (SCSI), universal serial bus (USB), or IEEE 1394 (e.g., Firewire™) connection elements. The networking devices 27 comprise the various components used to transmit and/or receive data over the network 9, where provided. By way of example, the networking devices 27 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 19 normally comprises various programs (in software and/or firmware) including an operating system (O/S) 21, a key recovery database 18, a certification manager 11, a mark database 13, and a registration manager 15. The O/S 21 controls the execution of programs, including the key recovery database 18, the certification manager 11, the mark database 13, and the registration manager 15. The O/S 21 also provides scheduling, input-output control, file and data management memory management, and communication control and related services. The key recovery database 18, the certification manager 11, the mark database 13, and the registration manager 15 facilitate the process for authenticating and authorizing the use of a mark.

According to an exemplary embodiment, the registration manager 15 authenticates the reseller server 5 and sends the information to the certification manager 11. The certification manager 11 authorizes the reseller to use the mark. The process for both the registration manager 15 and the certification manager 11 in general involves receiving information from a reseller server via a network that enables the mark owner to authenticate and authorize the reseller server 5 to use a mark. If the reseller server 5 is authenticated and authorized, preferably, a key and an encrypted mark are sent to the server that facilitates displaying the mark. Operation of the registration manager 15 is described in relation to FIGS. 3 and 7. Operation of the certification manager 11 is described in relation to FIGS. 3 and 8.

Figure 3:
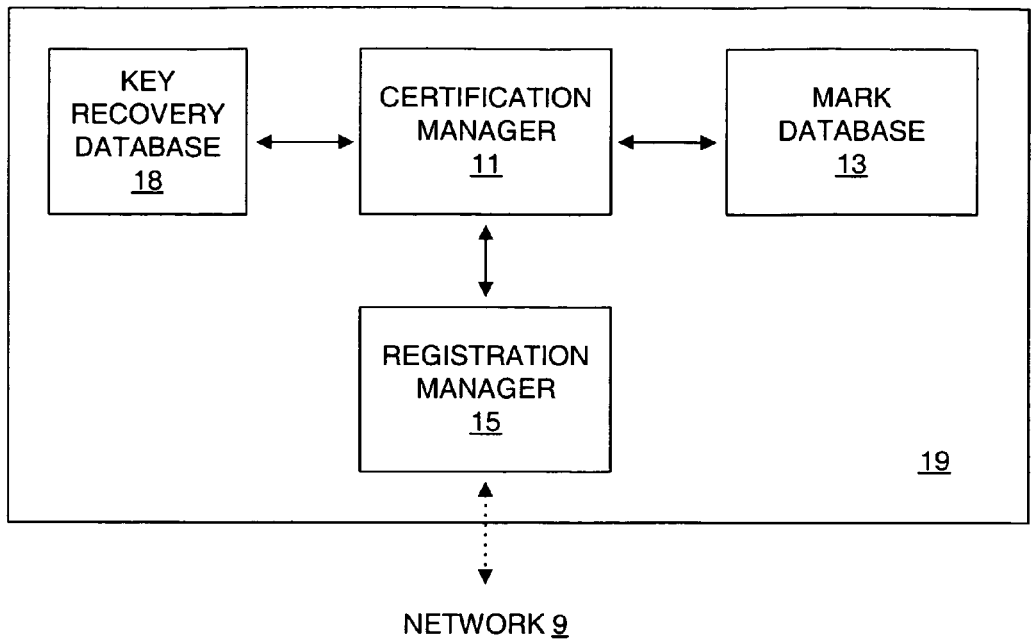
FIG. 3 is a block diagram of an embodiment of components stored in memory of the mark owner server shown in FIG. 2.

FIG. 3 is a block diagram of an embodiment of components stored in memory 19 of the mark owner server shown in FIG. 2. The registration manager 15 effectively communicates with a reseller server 5 via network 9. The registration manager 15 receives registration and authorization information from the reseller server 5 to authenticate the reseller server 5. The information for registering and authorizing the reseller to use the mark can include, but is not limited to, identity of the reseller, the address of the reseller, the telephone number of the reseller, user number already established as one of the mark owners' distributors and manufacturers, etc. The registration manager 15 sends the registration and authorization information to a certification manager 11, which processes the information and determines whether the reseller is authorized to use the mark of the mark owner. The registration manager 15 can store the reseller's registration and authorization information in a reseller database (not shown), which enables the mark owner server 3 to track and monitor the identity of the reseller. If the reseller is authorized, the certification manager 11 sends information of successful registration and authorization to the registration manager 15, which sends the information to the reseller server 5.

In addition, the certification manager 11 retrieves a public key and backup key from a key recovery database 18, and an encrypted mark and updated mark from a mark database 13. The certification manager 11 sends, any one of or in combination, the public key, backup key, encrypted mark, and updated mark to the registration manager 15 if the certification manager 11 determines that the reseller server 5 is authorized to use the mark. The registration manager 15 sends, any one of or in combination, the public key, backup key, encrypted mark, and updated mark to the reseller server 5 via the network 9. The key recovery database 18 tracks the public keys and backup keys that are distributed to the resellers and creates new keys for new resellers.

The mark database 13 tracks the encrypted marks and updated marks that are distributed to the resellers. The mark can be watermarked to include information to identify the mark owner and, after identifying the mark owner, deter users from using the mark in unauthorized ways. One method is to include time expiring logic such that the mark cannot be displayed by the reseller server 5 after the mark is displayed for a period of time, e.g., monthly, quarterly, and yearly. In general, a watermark could be used in various embodiments to deter improper attempts from copying or replicating the mark.

Figure 4:
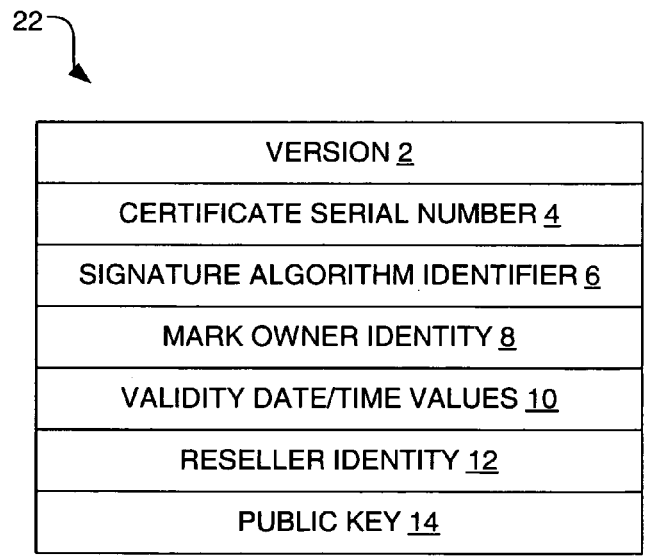
FIG. 4 is a block diagram of an embodiment of a public-key certificate that includes a public key.

The certification manager 11 can further issue a certificate to the reseller server 5 from a certification database (not shown). The certificate is a secure means of distributing public keys to the resellers via the network 9. An example of an embodiment of a certificate is shown in FIG. 4. The certification database tracks certificates 22 that are distributed to the resellers. In addition to others, the certificate 22 may be in a format under the International Telecommunication Union's X.509 version 3, which is hereby incorporated by reference in its entirety. The certificates 22 include information relating to, but are not limited to, version 2 of the certificate 22, certificate serial number 4, signature algorithm identifier 6, identity of the mark owner 8, validity date/time values 10, identity of the reseller 12, and public key 14.

Figure 5:
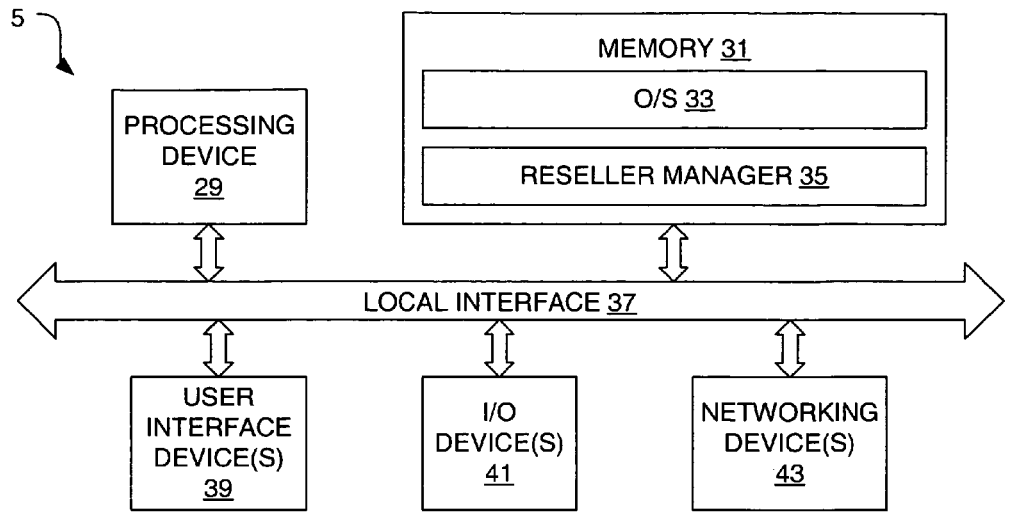
FIG. 5 is a block diagram of an embodiment of a reseller server shown in FIG. 1.

FIG. 5 is a block diagram of an embodiment of a reseller server shown in FIG. 1. The architecture for the reseller server 5 is similar to the architecture of the mark owner server 3 described above and therefore includes a processing device 29, one or more user interface devices 39, one or more I/O devices 41, and one or more networking devices 43, each of which is connected to a local interface 37.

The memory 31 in the reseller server 5 includes, among other elements, a reseller manager 35 that facilitates authenticating the use of a mark. According to an exemplary embodiment, the reseller manager 35 provides data corresponding to authenticating the use of a mark via the network 9. More particularly, the reseller manager 35 sends information for registering the reseller with the mark owner server 3 and for authorizing the reseller to obtain other information to use the mark, such as, certificates, public keys, encrypted mark, etc. As mentioned above, the information for registering and authorizing the reseller to use the mark can include, but is not limited to, identity of the reseller, the address of the reseller, the telephone of the reseller, customer (end user) number already established as one of the mark owner's distributors and manufacturers, etc. The reseller manager 35 further receives information from the mark owner server that allows the reseller to display the mark, such as the encrypted mark, a certificate containing a key, etc. In addition, in some embodiments, among others, memory 31 includes web pages and programming for generating and serving web pages in accordance with the functions described herein, and other embodiments include additional web servers for such functions.

Various programs have been described above. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, system operation will now be discussed. In the discussions that follow, flow diagrams are provided. Any process steps or blocks in these flow diagrams may represent modules, segments, or portions of code, preferably stored and/or communicated on recordable medium as logic, that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 6:
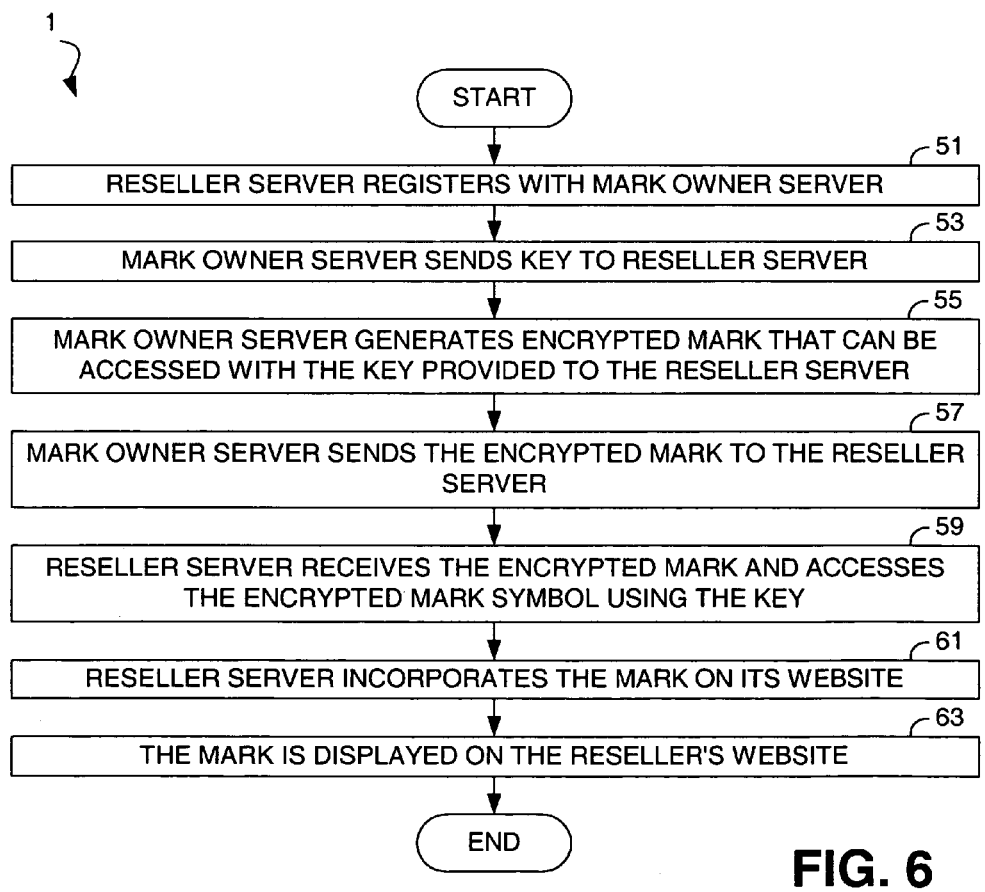
FIG. 6 is a flow diagram that illustrates an embodiment of operation of the system shown in FIG. 1 in authenticating the use of a mark.

FIG. 6 is a flow diagram that illustrates an embodiment of operation of the system shown in FIG. 1 in authenticating the use of a mark. With the system 1, a mark owner can control, monitor and track the use of its mark. The mark can include, but not is limited to, visual and audio marks. In addition, the visual marks could be static or dynamic images. According to an exemplary embodiment, marks may include any source identifier, such as that described in a treatise, *McCarthy on Trademarks and Unfair Competition*, 4th ed. (©2005 Thomson/West), which is incorporated by reference herein in its entirety. In addition, as would be understood by one reasonably skilled in the art upon reading the present disclosure, the term "mark" (in singular and plural tenses) is used in the present application in various contexts, including not only the intellectual property embodied in source identifiers themselves, as would be understood from the treatise identified above, but also including electronic (and other) representations of those identifiers, including stored and displayed representations. Furthermore, as discussed herein, additional access control coding may also be included with or in those digital representations.

Beginning with block 51, the system 1 for authenticating the use of a mark includes a reseller server 5 that registers with a mark owner server 3. The reseller server 5 can provide information such as, identity of the reseller, the address of the reseller, the telephone of the reseller, end user (customer) number already established as one of the mark owners' distributors and manufacturers, etc. In one example, among others, a reseller user provides registration information through a secure website that prompts for the registration information, such as through a display device connected to the reseller server 5. The information can be transmitted from the reseller server 5 to the mark owner server 3 via the network 9. In block 53, the mark owner 3 server generates and sends a key to the reseller server 5 based on the information provided by the reseller during registration. The mark owner server 3 can send the key to the reseller 5 server by way of file transfer protocol (FFP), hypertext transfer protocol (HTTP), or any other file transfer protocol. In addition, more generally, communications between the mark owner server 3 and the reseller server 5 can be conducted, in various embodiments, according to numerous optional communication protocols that would be understood by those reasonably skilled in the art.

As mentioned above, the key enables the reseller to access a mark stored in the mark owner server 3 so that the mark can be transmitted to a client computing device 7 for display. For example, an end user may access a web page from a reseller server 5 in some embodiments. The reseller server 5 sends a uniform resource locator (URL) to the mark owner server 3 that may include the key and the reseller's identification information. If the reseller is authorized to use a mark, the reseller server 5 pulls the mark from the mark owner server 3 and transmits the mark through the network 9 for display on a client computing device 7 for the end user to view. In various embodiments, authorization controls exist in reseller server software, mark owner server software, or both. In some embodiments, reseller web pages accessible by end users include URLs that point directly to mark owner web servers and further include identification information corresponding to particular resellers so that the mark owner servers can control access to the marks through real-time authorization control or manipulation of stored marks. For example, such manipulation includes, in some implementations, changing or deleting stored marks associated with certain resellers to reflect changes in reseller authorizations, including levels of authorization. Thus, in some implementations, there would be no need for real-time authorization controls on reseller or mark owner servers or for encryption of marks since mark owners could simply change or delete stored marks that are associated with particular resellers based upon changes in authorization.

In another example, the reseller server 5 can access an encrypted mark having time expiring software application from the mark owner server 3 using the key, as generally indicated in block 55. As mentioned above, the time expiring software application enables the encrypted mark to be displayed to an end user for a certain time period, e.g., one day, one week, one month, one quarter of a year, one half of a year, a year, etc. The time expiring software application can receive clock information from a network time server to prevent the reseller from tampering with the clock. In addition, a mark can contain tracking and reporting logic that obtains URL and/or IP address information associated with any web page currently displaying the mark and reports that information to the mark owner server 3, which can monitor and analyze use of the mark through a logging database.

In block 57, the mark owner server 3 sends the encrypted mark to the reseller server 5. In block 59, the reseller server 5 receives the encrypted mark and accesses the encrypted mark using the key. In block 61, the reseller incorporates the mark on the reseller's website and in block 63, the mark is displayed the reseller's website when an end user browses to it.

Figure 7:
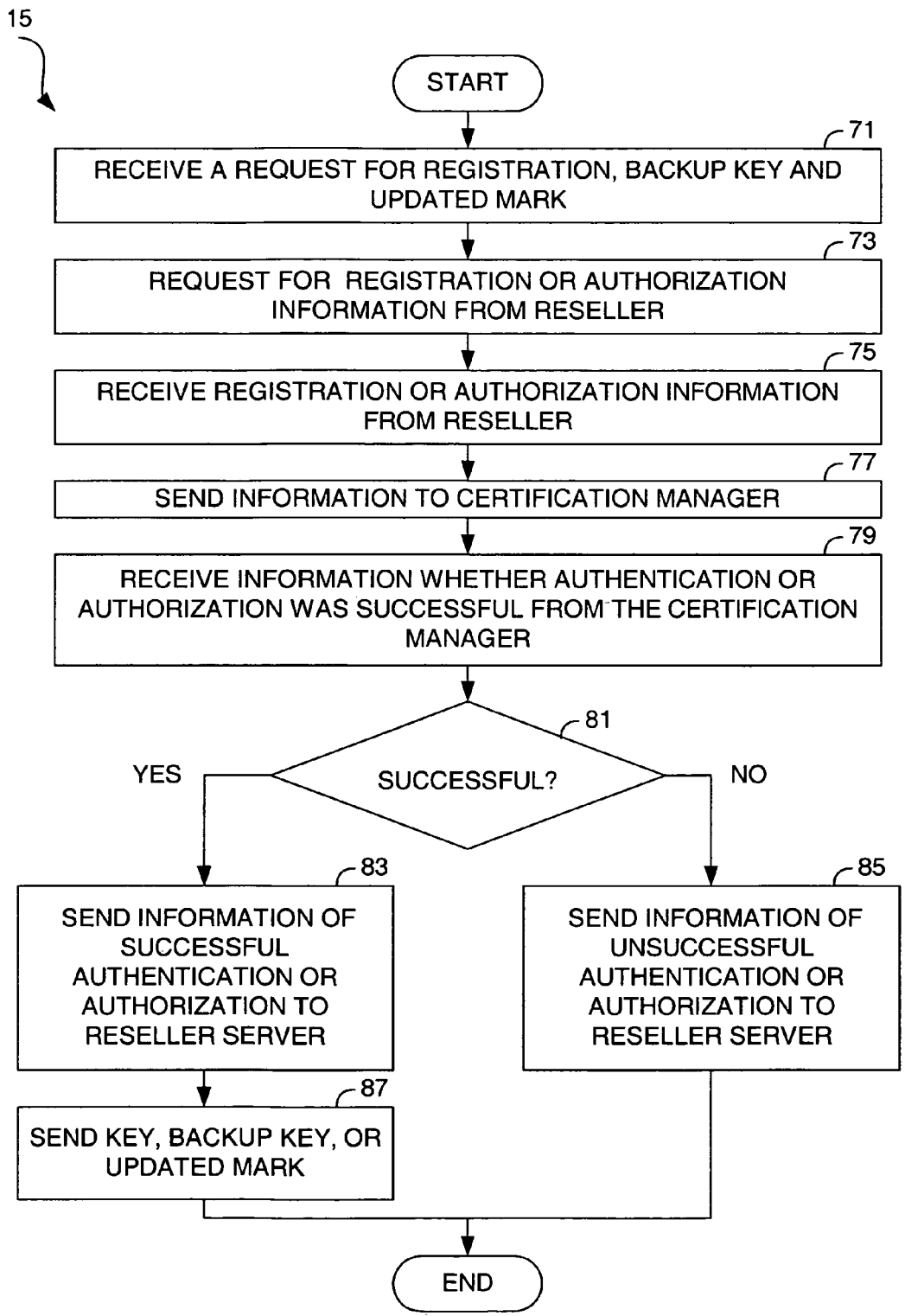
FIG. 7 is a flow diagram that illustrates an embodiment of operation of a registration manager of the mark owner server shown in FIG. 2.

FIG. 7 is a flow diagram that illustrates an embodiment of operation of a registration manager of the mark owner server 3 shown in FIG. 2. The registration manager 15 receives, as indicated in block 71, a request from a reseller server 5 for registering with the mark owner server 3 for authenticating the use of the mark. The registration manager 15 can further receive a request for a backup key and an updated mark from the reseller server 5. For example, the reseller server 5 can log into a secure web site that enables the reseller server 5 to request a backup key and an updated mark. It should be noted that the mark owner server 3 could provide the updated mark based on a certified level of the reseller. For example, the reseller could be certified at a gold, silver or standard level of, e.g., service. The mark owner server 3 can send the updated mark to the reseller server 5 if the reseller obtained a different certified level of service.

In block 73, the registration manager 15 requests the reseller server 5 for registration or authorization information and, in block 75, receives the registration or authorization information from the reseller server 5. The registration and authorization information can be, for example, the identity of the reseller, the address of the reseller, the telephone number of the reseller, and user (customer) number already established as one of the mark owners' distributors and manufacturers, etc. In block 77, the registration manager 15 sends information to a certification manager 11 to verify or authorize the reseller for the use of the mark.

In block 79, the registration manager 15 receives information whether authentication or authorization was successful from the certification manager 11 and, in block 81, determines from the information of the certification manager 11 that the reseller is authenticated or authorized to use the mark. If the reseller is authenticated or authorized to use the mark, the registration manager 15, as indicated in block 83, sends information of successful authentication or authorization to the reseller server 5, and in block 87, sends information that enables the reseller to use the mark, such as, but not limited to, a public key, backup key, an encrypted mark, updated mark, a certificate for transmitting the public key, etc. If the reseller is not authenticated or authorized to use the mark, the registration manager 15, as indicated in block 85, sends information of unsuccessful authentication or authorization to the reseller server 5. For example, a hacker could have stolen a reseller's registration and authorization information and so the reseller informs the mark owner of the incident, whereby the mark owner revokes any transaction using the reseller's stolen registration and authorization information. In other examples, a mark owner may determine that a reseller is no longer authorized for any use of a mark or for various levels of use, and that determination may be based upon a variety of factors, including, among others, failures of resellers to pay licensing fees, meet particular standards or levels of service or quality of products required by the mark owner.

Figure 8:
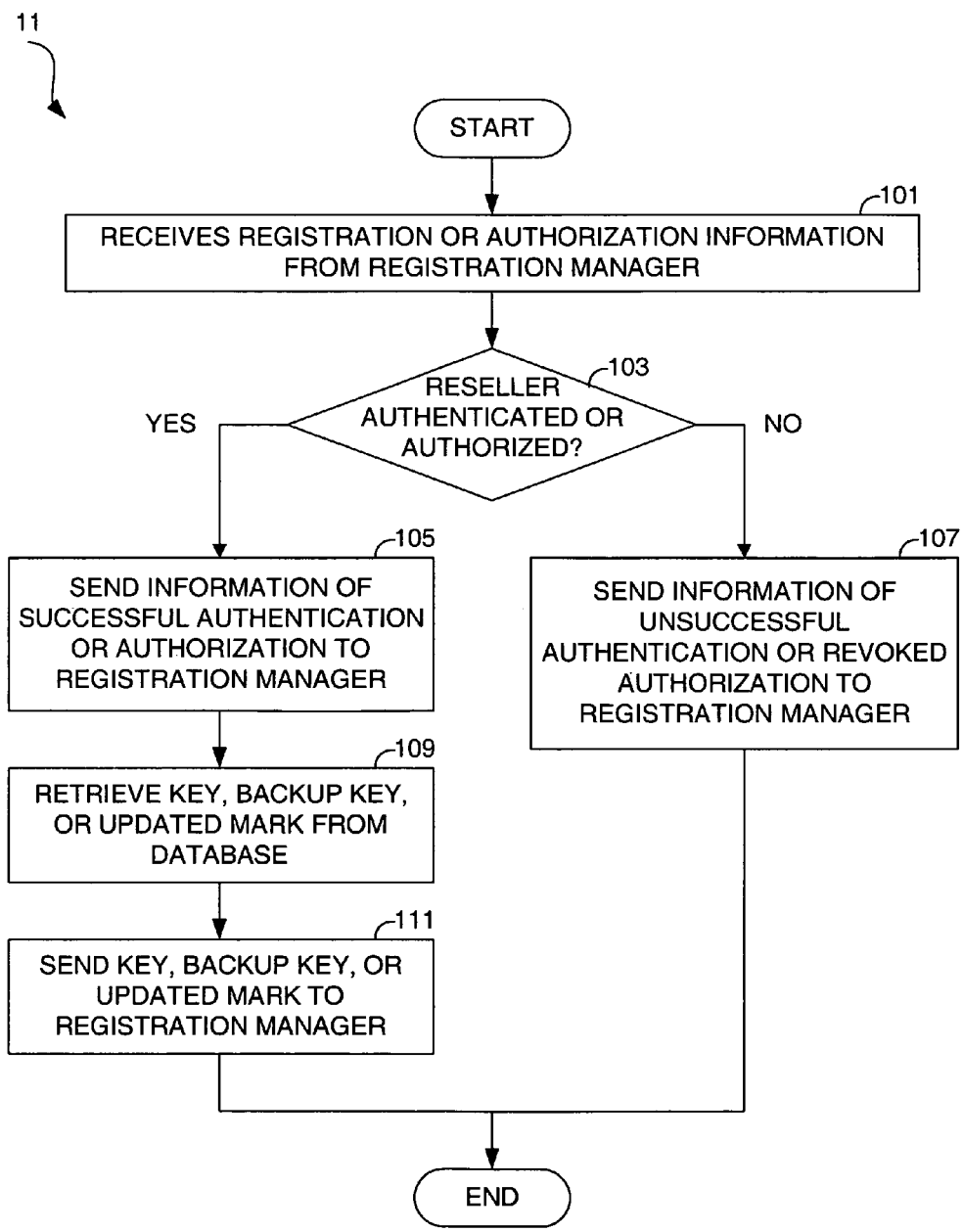
FIG. 8 is a flow diagram that illustrates an embodiment of operation of a certification manager of the mark owner server shown in FIG. 2.

FIG. 8 is a flow diagram that illustrates an embodiment of operation of a certification manager 11 of the mark owner server 5 shown in FIG. 2. Beginning with block 101 of FIG. 8, the certification manager 11 receives registration or authorization information from a registration manager 15. In block 103, the certification manager 11 determines whether the reseller is authenticated or authorized to use the mark based on the received registration or authorization information from the registration manager 15. If the reseller is authenticated or authorized to use the mark, the certification manager 11, as indicated in block 105, sends information of successful authentication or authorization to the registration manager 15.

In block 109, the certification manager 11 then retrieves information that enables the reseller to use the mark, such as, but not limited to a public key, backup key, an encrypted mark, updated mark, a certificate for transmitting the public key, etc. In block 111, the certification manager 11 sends the information that enables the reseller to use the mark to the registration manager 15, which sends the information to the reseller as explained in FIG. 7. If the certification manager 11 determines that the reseller is not authenticated or authorized to use the mark, the certification manager 11, as indicated in block 107, sends information of unsuccessful authentication or revoked authorization to the registration manager. The revoked authorization occurs when an authorized entity informs the certification manager of an abnormal situation requiring certification revocation. For example, a hacker could have stolen a reseller's registration and authorization information and so the reseller informs the mark owner of the incident, whereby the mark owner revokes any transaction using the reseller's stolen registration and authorization information. In another example, the reseller fails to meet the standard level of service and quality of product required by the mark owner. The certification manager 11 can retrieve from a revocation list (not shown) stored in memory that contains a time-stamped list of revoked authorizations.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for facilitating authentication and authorization of use of a mark of a mark owner, the system comprising:
 a processor; and
 a memory storing instructions that, when executed by the processor, cause the processor to perform operations comprising:
  receiving a first request from a reseller server to use the mark of the mark owner;
  registering the reseller server to use the mark of the mark owner;
  associating the reseller server with an authorization level that allows the reseller server to use the mark of the mark owner;
  receiving information indicating that the reseller server is not authorized to use the mark of the mark owner at the authorization level;
  changing, based on receipt of the information indicating that the reseller server is not authorized to use the mark of the mark owner at the authorization level, the authorization level associated with the reseller server;
  receiving a second request from the reseller server to access the mark of the mark owner; and
  providing access to a manipulated version of the mark of the mark owner that reflects a change in the authorization level associated with the reseller server since registering the reseller server.

2. The system of claim 1, wherein the manipulated version of the mark of the mark owner comprises a deleted version of the mark of the mark owner.

3. A non-transitory computer-readable medium storing computer-executable instructions which, when executed by a computer, cause the computer to perform operations comprising:
 receiving a first request from a reseller server to use a mark of a mark owner;
 registering the reseller server to use the mark of the mark owner;
 associating the reseller server with an authorization level associated with using the mark of the mark owner;
 receiving information indicating that the reseller server is not authorized to use the mark of the mark owner at the authorization level;
 changing, based on receipt of the information indicating that the reseller server is not authorized to use the mark of the mark owner at the authorization level, the authorization level associated with the reseller server;
 receiving a second request from the reseller server to access the mark of the mark owner; and
 providing access to a manipulated version of the mark of the mark owner to reflect a change in the authorization level associated with the reseller server since registering the reseller server.

4. The non-transitory computer-readable medium of claim 3, wherein the manipulated version of the mark of the mark owner is a deleted version of the mark of the mark owner.

5. A method for facilitating authentication and authorization of the use of a mark of a mark owner, the method comprising:
 receiving, at a processor, a first request from a reseller server to use the mark of the mark owner;
 registering, by the processor, the reseller server to use the mark of the mark owner;
 associating the reseller server with an authorization level associated with using the mark of the mark owner;
 receiving, at the processor, information indicating that the reseller server is not authorized to use the mark of the mark owner at the authorization level;
 changing, by the processor based on receipt of the information indicating that the reseller server is not authorized to use the mark of the mark owner at the authorization level, the authorization level associated with the reseller server;
 receiving, at the processor, a second request from the reseller server to access the mark of the mark owner; and providing, by the processor, access to a manipulated version of the mark of the mark owner to reflect a change in the authorization level associated with the reseller server since registering the reseller server.

6. The method of claim 5, wherein the manipulated version of the mark of the mark owner comprises a deleted version of the mark of the mark owner.

\* \* \* \* \*